Dec. 21, 1926.
M. K. LAMBERT
1,611,462
LAYERED BATTING AND APPARATUS FOR PRODUCING SAME
Filed April 14, 1925
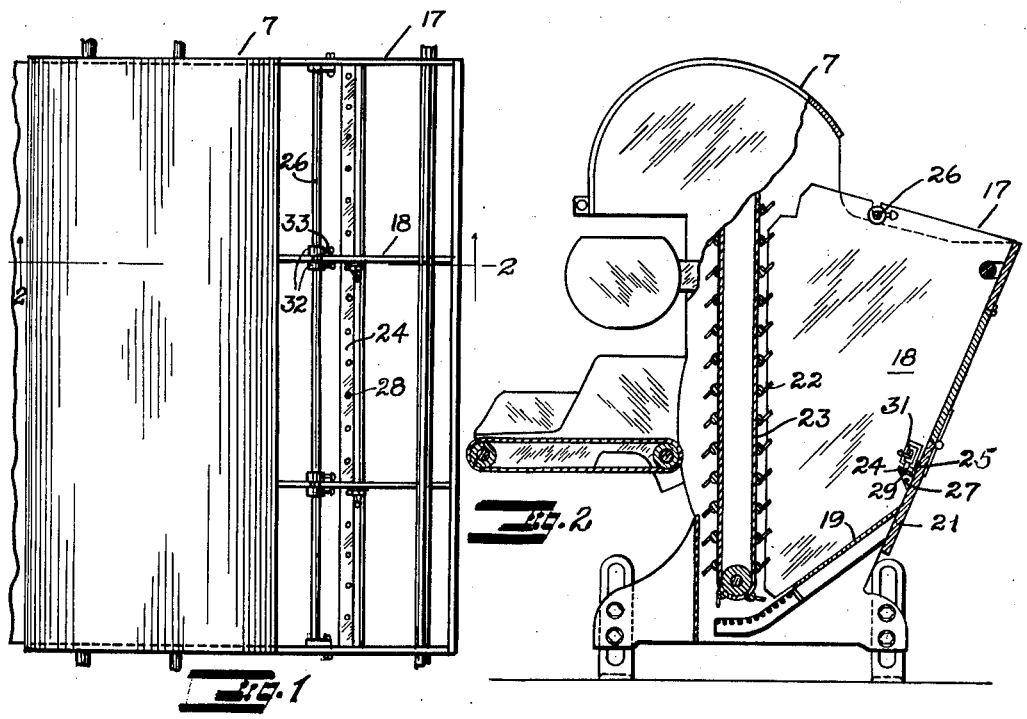
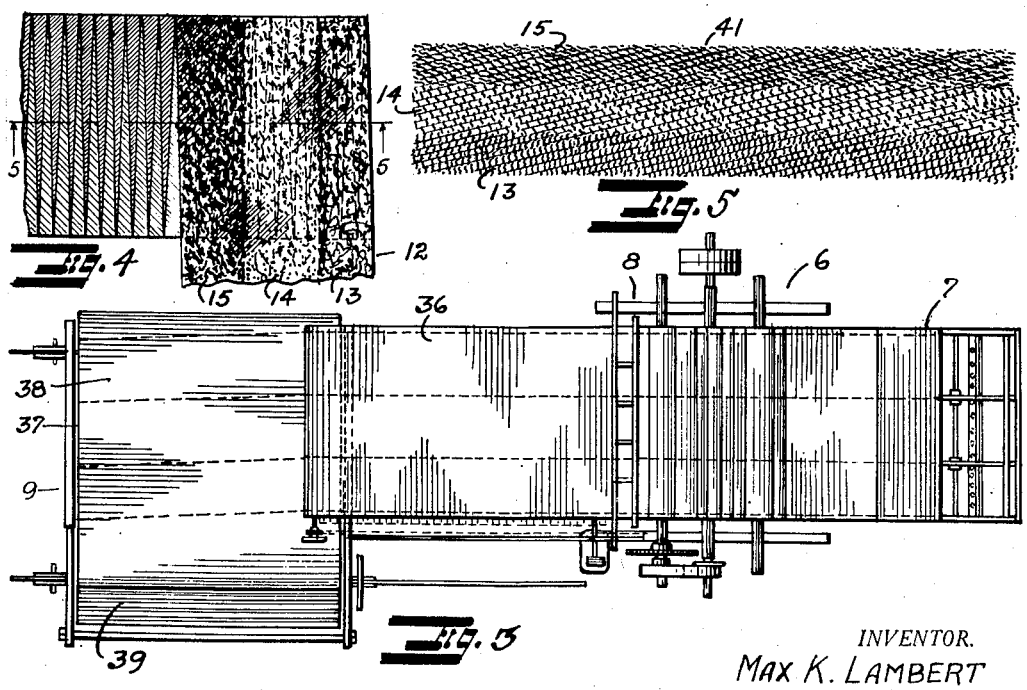
INVENTOR.
Max K. Lambert
BY Joseph B. Gardner
ATTORNEY Patented Dec. 21, 1926.

1,611,462

UNITED STATES PATENT OFFICE.

MAX K. LAMBERT, OF OAKLAND, CALIFORNIA, ASSIGNOR TO STAR MATTRESS COMPANY, OF OAKLAND, CALIFORNIA, A CORPORATION OF CALIFORNIA.

LAYERED BATTING AND APPARATUS FOR PRODUCING SAME.

Application filed April 14, 1925. Serial No. 22,926.

My invention relates to the production of built-up batting particularly adapted for stuffing mattresses, cushions and the like.

An object of the invention is to provide a batting in which ingredients having differing and desirable qualities as stuffing are combined in integrally associated layers.

Another object of the invention is to provide a means for integrally securing a light and fluffy stuffing material, such as kapok, to a layer of a binding medium to form a layered bat of the materials.

A further object of the invention is to provide an apparatus particularly arranged for producing the batting of my invention.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:—

Figure 1 is a plan view of a feeder forming part of the apparatus of my invention.

Figure 2 is a sectional view of the feeder taken on the line 2—2 in Figure 1.

Figure 3 is a plan view of a complete bat forming apparatus.

Figure 4 is a fragmentary top view of the batting as it is formed on the lapping table forming part of the apparatus.

Figure 5 is an enlarged fragmentary sectional view of the batting taken on the line 5—5 in Figure 4, the thickness of the batting being exaggerated in proportion to a corresponding length thereof, and the position of the webs forming the batting being indicated by dash lines.

As is well known, no single material is now in use which in itself possesses all the requisites of an ideal mattress stuffing. Thus kapok, which is extremely light and fluffy, is brittle and lacks self-binding power, so that a mattress stuffing formed of kapok alone soon loses its resiliency and becomes dead and lumpy. Wool, on the other hand, while possessing ideal self-binding qualities, mats too closely to maintain a proper resiliency when used alone, while cotton in its various forms, lacks both resiliency and binding power and so becomes permanently compressed and lumpy. In the attempt to produce a stuffing which will be fluffy, resilient, and of stable structure, and which will maintain these qualities through a long period of use, various methods of combining the above mentioned, and other ingredients, have been resorted to with varying degrees of success. Homogeneous mixtures formed of light and fluffy materials which are not self-binding, such as kapok, for instance, combined with a binding material such as wool, have not been found to give a stuffing completely possessing the combined qualities of the ingredients, since the separation of the fibers of a given material in itself tends to nullify the physical qualities of that material. Another device that has been resorted to is to separately form laminations of the various materials, and then build up a stuffing by arranging the different laminations alternately. Mattress stuffings constructed in accordance with the latter method, have to some extent proved superior to those formed by the mixture method, but the laminations, being of necessity thick enough to be handled, have each been subject to the disadvantages of the particular material therein. Even with the laminations as thin as can be handled, the independence of the various laminations will to some extent be maintained, for the surface union of laminations separately formed and then placed together will not always in itself be sufficient to entirely overcome the slipping of the surfaces over each other as the mattress is depressed when in use, with the result, that, even if a primary binding between fibers of adjacent surfaces occurs, the laminations will soon become more or less independent and the mattress will lose its original resiliency and structural permanence. Furthermore, the cost of such a structure is prohibitive, as duplication of equipment for making the various laminations will be required and the labor of placing the great number of laminations alternately together will prove an added expense.

In accordance with my invention, however, means are provided for producing a stuffing in the form of a batting in which alternate layers of kapok and other ingredients are so produced that the resulting structure is an integral one, thus avoiding the possible structural weakness in a lamination structure formed as previously mentioned. To effect the desired structure, means are provided for supplying to a web lapping table a matted web having formed therein longitudinally extending parallel bands formed of different materials, the bands being arranged to be integrally connected at their edges through the entwining of the fibers thereof during the process of manufacture of the web. With the web so formed, the lapping table, in constructing the batting, will produce a bat having the surfaces thereof of the same material as are the outer bands of the web and the center portions of the same material as that of the inner band or bands.

As here shown, the bat forming apparatus 6 of my invention comprises a feeder 7, a web forming mechanism 8, and a lapper 9. The feeder 7 and web forming mechanism 8 are particularly arranged to cooperate to form a web 12 of required width and having defined therein a plurality of longitudinally extending successive bands 13, 14 and 15 of different materials.

To provide for the formation of the banded web 12, the feeder hopper 17, which extends transversely of the feeder, is provided with adjustably positioned partitions 18 closely fitting the bottom 19 and rear wall 21 of the hopper and terminating forwardly adjacent the teeth 22 of the feeding apron 23. The partitions are here shown arranged to be mounted and held suitably positioned in the hopper by means of a supporting flange 24 extending from the rear wall of the hopper and a cross rod 26 extending across the hopper at its upper portion. As shown, the flange 24 is provided by fixing an angle iron 25 to the wall 21, the partition being provided with a suitable notch 27 arranged to extend around the flange and to bear on the upper face thereof. For the purpose of securing the partition in desired position in the hopper, the flange 24 is provided with spaced holes 28 in which the bolt 29 of a suitable bolt-catch 31 mounted on the partition is adapted to engage. The upper portion of the partition is notched at its edge to extend around and slidably engage the cross rod 26 and is arranged to be fixed thereto. As here shown, slidable collars 32, provided with set screws 33, are mounted on the rod on opposite sides of a partition, and when a cooperating pair is moved against the partition and set in position, serve to hold the partition fixed as desired. The rod 26 is preferably removably mounted in any convenient manner between the opposite side walls of the hopper to facilitate the insertion or removal of the partitions.

With the hopper divided as described, web forming materials of differing kinds placed in adjacent hopper portions will be carried out of the hopper by the apron 23 to be delivered therefrom in side by side streams to the web forming mechanism 8. Since a certain amount of lateral spreading of the materials of adjacent streams is permitted on account of the absence of any partition between the delivered streams, an intermingling of the adjacent edge fibers during the web forming process results in the formation of a matted web having defined therein bands of the various materials integrally associated at their junctures. It will be noted that the web forming apparatus 8 may be of any structure suitable to accomplish the desired purpose, and might be any one of a number of such devices now on the market. Adjustment of the spacing of the partitions, it will now be noted, directly determines the relative widths of the various bands of the completed web as it is delivered on the running-out table 36 of the web forming machine, so that a web containing the various ingredients in any desired proportion may be formed.

The banded web is arranged to be delivered from the running-out table 36 onto the lapping table 37 of the lapping machine 9, it being noted that as here shown, the lapping table is arranged to be reciprocated under the feeding edge of the table 36 while at the same time the top surface 38 of the table, which is in the form of a continuous belt, advances at any desired rate toward the front of the table to lap the web and deliver the bat, when completed, for storage, or further manipulation, a storage roller 39 being here shown provided on which the bat is arranged to be wound. It will now be noted that the lapping of the web in zigzag fashion, as clearly shown in Figure 4, results in the formation of a bat 41 in which each web as deposited extends diagonally from one surface to the other, with the result that the material of one edge of the web forms the top layer of the bat section, that of the other forms the bottom layer of the bat section, and the materials of intermediate web bands, if any, form the center layer, or layers, of the bat. Since the web produced as described is very fluffy and porous, many of the fibers extending from a given fold will mutually entwine with the opposing fibers of adjacent folds, while others will actually enter the interstices of the neighboring folds to become engaged therein, with the result that a substantially integral union between adjacent folds is effected. Furthermore, since each of the superposed web folds comprising a bat is itself integral, and extends diagonally through the bat, and the union of the various folds which occurs during the lapping process is very complete, the various layers of each material defined as described, are thus joined in a truly integral structure in the resulting bat.

Owing to its superior qualities as a mattress stuffing, I prefer to use kapok as one of the materials of a mattress batting, combining with it in required proportion either cotton or wool, or both, as supporting and binding agencies for the kapok. Thus, the successive bands, 13, 14 and 15 may be respectively formed of cotton, kapok, and wool, it being noted that the resulting bat, as delivered from the lapping table, will thus be formed with a cotton layer at its bottom, a kapok layer in its mid-section and a wool layer at its top. In this manner the kapok layer is confined between layers of less fluffy materials, which materially aids in handling it as an ingredient of stuffings. It is obvious that any two or more materials whose combined qualities would form a satisfactory mattress stuffing might be used in forming the bat of my construction.

It will readily be understood that any desired number of laminations formed of the bat of my invention may be laid together to build up a stuffing of desired thickness, the surface union of the fibers between such layers being effected very much as between the web folds of which the batting is formed, so that a stuffing when formed as herein provided, and properly tufted, will produce a structure of great permanence. In this manner a stuffing has been provided which may be used for mattresses, cushions, quilts, and the like with equal facility.

I claim:

1. In a bat forming apparatus, means for forming a matted web having integrally associated longitudinally extending bands of different materials, and means for lapping a web to form said bat having the different layers of said web extending diagonally therethrough.

2. As an article of manufacture, a batting having layers of different material defined therein and formed of matted webs extending diagonally between the faces of the batting.

3. In a bat forming apparatus, a matted-web forming mechanism, means for delivering to said mechanism parallel streams of different fibrous materials having adjacent coterminous edges whereby a web may be formed having integrally associated banded portions of the different materials, and means for forming a mat of said web whereby the material of opposite edges thereof will form the opposite sides of said mat.

4. In a bat forming apparatus; a matted-web forming mechanism; means for simultaneously delivering to said mechanism parallel streams of cotton, kapok and wool having adjacent stream edges coterminous, whereby an integral web may be formed having portions formed of cotton, kapok, and wool, in order; and means for forming a mat of said web to have successive layers of cotton, kapok and wool defined therein.

5. The process of constructing a layered batting which comprises forming an integral matted web having bands of differing materials defined therein, and obliquely lapping said web to form a bat.

In testimony whereof, I have hereunto set my hand at Oakland, California, this 10th day of April, 1925.

MAX K. LAMBERT.